J. W. CLOUD.
FLUID PRESSURE BRAKE.
APPLICATION FILED MAR. 26, 1903.

959,114.   Patented May 24, 1910.

WITNESSES
Jas. B. MacDonald
J. S. Custer

INVENTOR,
John W. Cloud
By E. Wright
Att'y.

UNITED STATES PATENT OFFICE.

JOHN WILL. CLOUD, OF LONDON, ENGLAND, ASSIGNOR TO THE WESTINGHOUSE AIR BRAKE COMPANY, OF PITTSBURG, PENNSYLVANIA, A CORPORATION OF PENNSYLVANIA.

FLUID-PRESSURE BRAKE.

959,114.  Specification of Letters Patent.  Patented May 24, 1910.

Application filed March 26, 1903. Serial No. 149,691.

*To all whom it may concern:*

Be it known that I, JOHN W. CLOUD, a citizen of the United States, residing in London, England, have invented a certain new and useful Improvements in Fluid-Pressure Brakes, of which improvement the following is a specificaton.

This invention relates to fluid pressure brake apparatus for railway and like vehicles and has for its object to provide a device by means of which, without necessarily altering existing brake mechanism of this nature, a graduated release of the brakes after they have been applied, may be secured.

Brake apparatus of the kind to which this invention relates is now well known, and need not therefore be referred to in detail. It comprises essentially a brake cylinder, in which is located a piston, the brake shoes being connected to the rod of this piston through rods and levers, by means of which, when the piston is forced outward by air under pressure admitted to the brake cylinder, the brake shoes are applied to the wheels. Such brake apparatus further comprises an auxiliary reservoir, in which is stored air under pressure supplied through a main train pipe from a main reservoir, in which a supply of compressed air is maintained by a pump, both of these latter being usually located on the engine. The auxiliary reservoir is connected to the train pipe and to the brake cylinder through a triple valve which is actuated to admit compressed air from the auxiliary reservoir to the brake cylinder in order to apply the brakes whenever the air pressure in the train pipe is reduced, and to exhaust the compressed air from the brake cylinder into the atmosphere through a release port in the triple valve when the pressure in the train pipe is restored, thereby releasing the brakes.

According to my invention, in order to obtain a graduated release of the brakes I provide a device connected with the train pipe or auxiliary reservoir which actuates a valve located between the exhaust port of the triple valve and the atmosphere, for the purpose of controlling the escape of air from the brake cylinder. Said valve is adapted to be opened and closed by variation in main train pipe pressure and the pressure of the air escaping from the brake cylinder.

Figure 1:
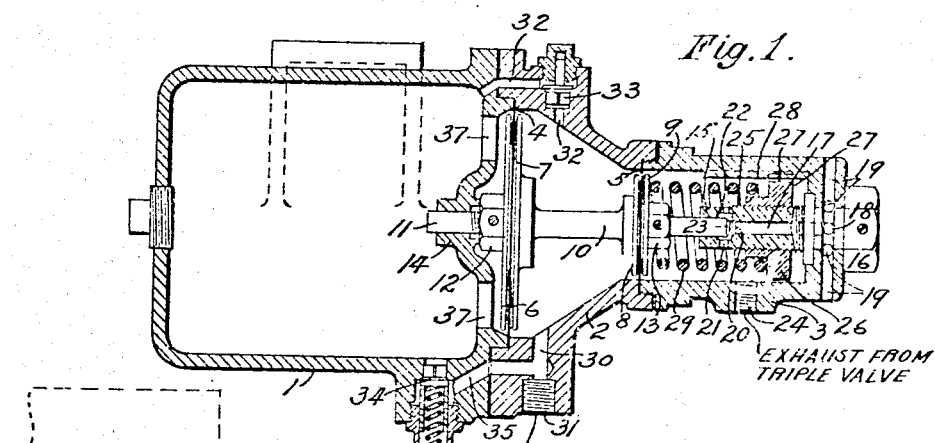
Figure 2:
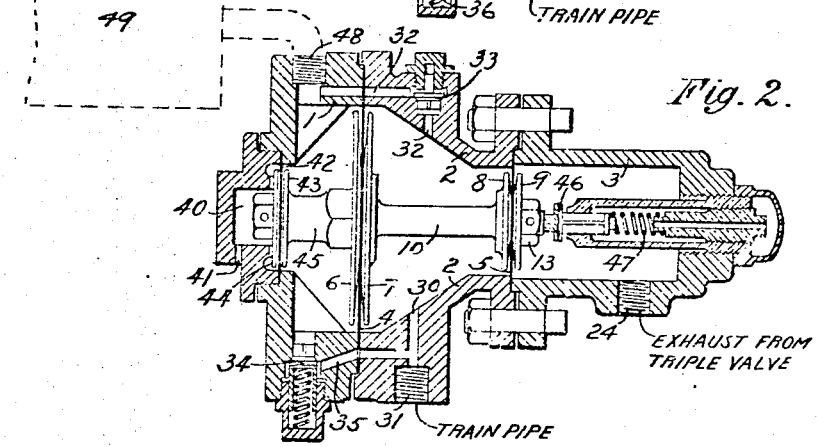
Figure 3:
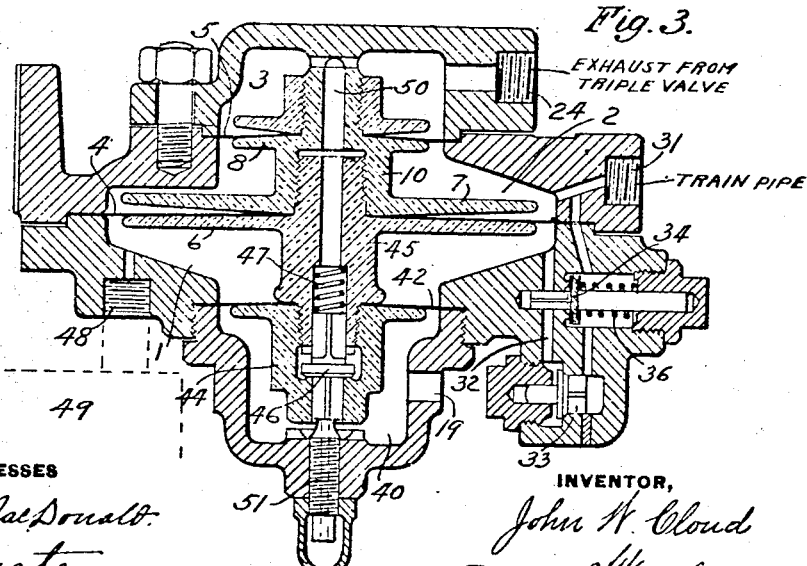

In the accompanying drawings:—Figure 1 is a sectional view of one form of device constructed in accordance with my invention; Figs. 2 and 3 are similar views showing modified forms of the device illustrated in Fig. 1.

Similar reference numerals denote the same parts in all the figures.

Referring now to Fig. 1, the device consists of a reservoir 1, an intermediate casing 2, and an end casing 3, these three parts being arranged and connected together substantially in the manner shown. The device may be supported on the vehicle or attached to a convenient part of the brake apparatus in any suitable manner. Between the reservoir 1 and the intermediate casing 2 is fixed a flexible diaphragm 4, another flexible diaphragm 5 being fixed between the intermediate casing 2 and the end casing 3. Abutting against the sides of these diaphragms are plates 6, 7, 8, 9, having their surfaces adjacent to the diaphragms 4, 5, slightly convex. The plates 7, 8, located between the diaphragms 4, 5, may be formed in one piece, the connection between them being in the form of a tubular stem 10 and all the plates may be connected together and securely held against the diaphragms by means of a rod 11 and nuts 12, 13. One end of the rod 11 is adapted to slide in an orifice 14 centrally located in that end of the reservoir 1 which is nearest the diaphragm 4, the other end sliding in a bearing formed in a projection 15 attached to the inside of the end casing 3 of the device by means of a nut 16 in the manner shown. This projection 15 has a central cavity 17, communicating at one end with the atmosphere through orifices 18, 19, in the casing 3 and at the other end with the interior of the said casing through a valve seat 20, chamber 21 and openings 22. One end 23 of the rod 11 projects beyond the bearing in the projection 15 above referred to into the chamber 21, and is adapted to coöperate with the valve seat 20 and act as a valve to cut off communication between the interior of the casing 3 and the atmosphere through the cavity 17 and the orifices 18, 19. The projection 15 is provided with an external screw thread 25 and an internally threaded collar 26 surrounding the threaded portion of the projection 15. Said collar is prevented from rotating by means of a groove 27 in its circumference engaging with a longitudinal guide 28 formed on the inside of the casing 3. The position of this collar can be adjusted longitudinally by rotating the projection 15 through the intermediary of the locked nut 16. A spring 29 is inserted between the piston 9 and the collar 26, the tension of which can be adjusted by altering the position of the collar 26 in the manner above described. The interior of the casing 3 is arranged to communicate with the release port of the brake cylinder in the triple valve to which it may be connected by means of a pipe inserted into the opening 24 in said casing. The interior of the intermediate casing 2 communicates through the passage 30 with the main pipe by a pipe inserted into the orifice 31. Communication between the interior of the casing 2 and the reservoir 1 is also provided by means of a passage 32, a check valve 33 being inserted in this passage in order to prevent air under pressure flowing from the reservoir 1 into the casing 2. The reservoir 1 communicates with the passage 30 leading from the main pipe to the interior of the casing 2, through a passage 35 in which is located a loaded valve 34. The pressure at which the valve 34 will permit air to pass from the reservoir 1, can be adjusted by means of the spring 36. Openings 37 are provided in that end of the reservoir adjacent to the diaphragm 4, so that the air under pressure in the reservoir may act on said diaphragm.

The operation of the device is as follows:—When the brakes are fully released, air under pressure will flow from the main train pipe of the brake apparatus through the passage 30, into the intermediate casing 2 and also through the passage 32, past the check valve 33 into the reservoir 1, until the pressure in the interior of the casing 2 and reservoir 1 is equal to the pressure existing in the train pipe. The diaphragm 4 will consequently be in equilibrium. The pressure of the spring 29 acting on the diaphragm 5, being slightly greater than the air pressure acting on the opposite side, will, under these circumstances, tend to maintain the parts in the position shown in the drawing, that is to say, the valve 23 will be open. In order to apply the brakes, the pressure in the train pipe must be reduced, and, consequently, the pressure in the intermediate casing 2 will be correspondingly reduced. The pressure in the reservoir 1 will not, however, be reduced, unless such a reduction of pressure in the main pipe has been made as will leave a difference of pressure in the reservoir 1 sufficient to open the loaded valve 34. The greatest difference of pressure which can exist between that in the reservoir 1 and the casing 2 is obviously dependent upon the load on the valve 34. The excess of pressure in the reservoir 1 will cause the diaphragms 4 and 5 to be moved to the right, and thereby close the valve 23, it being understood that under these circumstances there is only atmospheric pressure in the end casing 3. In order to partially release the brakes, the pressure in the train pipe must be slightly increased and the triple valve will then move to allow the air under pressure to exhaust from the brake cylinder through the release port in the triple valve into the interior of the end casing 3 by way of the orifice 24, owing to the connection existing between the latter and the release port of the triple valve. The air under increased pressure in the train pipe will also flow into the intermediate casing 2, and as soon as the increased pressure in casing 2 together with the pressure from the brake cylinder in the end casing 3 preponderates over the pressure existing in the reservoir 1, the diaphragm 5, aided by the spring 29, will be moved to the left and the valve 23 will be opened, thereby permitting the air in the brake cylinder to exhaust partially to the atmosphere. The pressure of air flowing from the brake cylinder is, however, constantly decreasing; it follows, therefore, that the pressure in the reservoir 1 will eventually again preponderate, and acting on the diaphragm 4 will close the valve 23, and consequently the exhaust from the brake cylinder, so that the brakes will be only partially released. If now the pressure in the train pipe be again increased, the increased pressure in chamber 2 acting on diaphragm 4 will establish a preponderance of pressure which will again open valve 23 and permit a further reduction of pressure in the brake cylinder before the superior pressure in reservoir 1 again closes valve 23.

Referring now to Fig. 2 the spring 29 which is shown in Fig. 1 for the purpose of balancing the pressure of the air in chamber 2 on the diaphragm 5 and maintaining the valve 23 open when the pressure in chambers 1 and 2 is equal, is dispensed with and in lieu thereof I provide an additional small chamber 40 open to the atmosphere through the orifice 41 and separated from the chamber 1 by a diaphragm 42. The diaphragm 42, which is connected by means of the plates 43, 44 and rod 45 with the plate 6 and from thence through the rod 10 to the plate 9, has the same area as the diaphragm 5, consequently the pressure of the air in chamber 2 on the diaphragm 5 will be balanced by the pressure of air in chamber 1 on the diaphragm 42. The valve 46 which differs somewhat in form from the corresponding valve 23 in Fig. 1 is not connected to the diaphragm stem but is maintained in contact therewith by means of a light spring 47. The chamber 1 is also shown in Fig. 1 as being smaller and connected through an orifice 48 with a suitable reservoir 49. These modifications make no difference in the operation of the device which takes place in the same manner as above described with reference to Fig. 1.

In Fig. 3 a further modified form of the device is shown. This form differs in no essential particular from those shown in Figs. 1 and 2, either in principle or operation. It will be observed that in this form of the device the air escaping from the brake cylinder into the chamber 3 passes from thence to a central channel 50, past the valve 46 into the chamber 40, and from thence through orifice 19 to the atmosphere. In this construction, when the diaphragms and pistons are moved the valve 46 will be opened by reason of its coming into contact with a stop 51. This stop is preferably made adjustable, as shown.

Since while the brakes are being released, the auxiliary reservoirs throughout the train are all in free communication with the main train pipe owing to the fact that the triple valve is in the release position, it is clear that the pressure in the auxiliary reservoir will vary in the same manner as the main pipe pressure. The chamber 2 of the gradual release device may, therefore, be connected to the auxiliary reservoir instead of to the train pipe, without altering the operation of the device.

It will be obvious that, by increasing the pressure of air in the train pipe by small increments, the pressure in the brake cylinder may be gradually reduced by corresponding increments and a graduated release of the brakes thus obtained.

With triple valves as ordinarily constructed, for use with fluid pressure brake apparatus, immediately the pressure in the train pipe is increased for the purpose of releasing the brakes the parts are moved to the release position, in which position the auxiliary reservoir is fed with compressed air from the train pipe through the triple valve. It is obvious, therefore, that in fluid pressure brake apparatus provided with the device described above, while the brakes are being gradually released, the auxiliary reservoir will be recharged with compressed air from the train pipe through the triple valve.

It will be seen that by the use of the device described above, no alteration to existing brake apparatus is necessary in order to obtain a graduated release of the brakes. It is only necessary that the connections indicated between the train pipe and the exhaust port of the triple valve should be made with the device, in order to secure this result. Also the free and full release of the brake when desired is not interfered with.

I wish it to be understood that I do not limit myself to the constructions herein shown and described, as modifications may obviously be made therein without departing from the spirit and scope of my invention.

Having now described my invention, what I claim as new and desire to secure by Letters Patent is:—

1. In a fluid pressure brake, the combination with a triple valve having a brake cylinder exhaust port, of a valve for controlling said port, and two diaphragms of different areas subject to the train pipe pressure for operating said valve, one of said diaphragms being subjected on its opposite side to pressure from a reservoir.

2. In a fluid pressure brake, the combination with a triple valve having a brake cylinder exhaust port, of a valve for controlling said port, and two connected diaphragms of different areas for operating said valve, the space between said diaphragms communicating with the train pipe, and one of said diaphragms being subjected on its opposite side to pressure from a reservoir.

3. In a fluid pressure brake, the combination with a triple valve having a brake cylinder exhaust port, of a valve for controlling said port, and two diaphragms for operating said valve, the diaphragms being subject on their adjacent sides to train pipe pressure, one diaphragm subject on its opposite side to pressure from the triple valve exhaust, and the other diaphragm to pressure from a reservoir.

4. In a fluid pressure brake, the combination with a triple valve exhaust port, of a valve for controlling said port, a movable abutment subject to the opposing pressures of a reservoir and the train pipe and brake cylinder for operating said valve, means for feeding the reservoir from the train pipe, and a loaded valve between said reservoir and the train pipe chamber.

5. In a fluid pressure brake, the combination with a brake cylinder exhaust passage and a valve controlling said passage, of a movable abutment exposed on one side to train pipe pressure and on the opposite side to a variable fluid pressure, and another movable abutment exposed on one side to brake cylinder pressure, said valve being operated by both abutments.

6. In a fluid pressure brake, the combination with a brake cylinder exhaust passage and a valve for controlling said passage, of two movable abutments for operating said valve, one abutment being subject on one side to train pipe pressure with means for equalizing the pressure upon opposite sides, and the other abutment being subject on one side to brake cylinder pressure.

In testimony whereof I have hereunto set my hand.

JOHN WILLS CLOUD.

Witnesses:
FREDERICK WILLIAM LE VALL,
ARTHUR ALFRED BERGIN.